United States Patent
Schermanz et al.

(10) Patent No.: US 7,927,391 B2
(45) Date of Patent: Apr. 19, 2011

(54) CERIA BASED GLASS POLISHING COMPOSITION AND A PROCESS FOR THE MANUFACTURE THEREOF

(75) Inventors: Karl Schermanz, Launsdorf (AT); Johann Schönfelder, Althofen (AT)

(73) Assignee: Treibacher Industrie AG, Treibach-Althofen (AT)

( * ) Notice: Subject to any disclaimer, the term of this patent is extended or adjusted under 35 U.S.C. 154(b) by 357 days.

(21) Appl. No.: 11/996,066

(22) PCT Filed: Jul. 19, 2006

(86) PCT No.: PCT/AT2006/000306
§ 371 (c)(1), (2), (4) Date: Mar. 26, 2008

(87) PCT Pub. No.: WO2007/009145
PCT Pub. Date: Jan. 25, 2007

(65) Prior Publication Data
US 2008/0307712 A1    Dec. 18, 2008

(30) Foreign Application Priority Data

Jul. 20, 2005    (AT) ................. A 1223/2005

(51) Int. Cl.
*C09K 3/14* (2006.01)
*C22B 59/00* (2006.01)
(52) U.S. Cl. ......... 51/309; 423/21.1; 423/299; 423/300; 423/301; 423/304; 423/305; 423/467; 423/511; 423/512.1; 423/263
(58) Field of Classification Search .............. 51/309; 423/21.1, 299, 300, 301, 304, 305, 467, 511, 423/512.1, 263
See application file for complete search history.

(56) References Cited

U.S. PATENT DOCUMENTS

| 4,786,325 | A | * | 11/1988 | Melard et al. ............... 106/3 |
| 4,942,697 | A | | 7/1990 | Khaladji et al. |
| 6,478,836 | B1 | * | 11/2002 | Kido et al. ............... 51/309 |
| 6,562,092 | B1 | * | 5/2003 | Ito et al. ............... 51/309 |
| 6,585,787 | B2 | | 7/2003 | Yamasaki et al. |
| 2004/0031206 | A1 | * | 2/2004 | Uchino et al. ............... 51/307 |

FOREIGN PATENT DOCUMENTS

| JP | 11 269455 | | 10/1999 |
| JP | 2004-107186 | * | 4/2004 |

OTHER PUBLICATIONS

Li, Liangcai: Database CA [Online] Chemical Abstracts Service, Columbus, Ohio, US; "Manufacture of white ceric oxide" XP002402540.

* cited by examiner

*Primary Examiner* — Elizabeth D Wood
(74) *Attorney, Agent, or Firm* — Workman Nydegger

(57) ABSTRACT

The invention is directed to a process for the manufacture of a ceria based polishing composition, comprising (a) suspending an inorganic cerium salt or cerium hydroxide with a cerium content calculated as cerium oxide in the range of 50%-100% based on Total rare earth oxide (TREO) in an aqueous medium thereby obtaining an aqueous suspension, (b) treating said aqueous suspension with an acid or a salt of an acid selected from the group of HF, $H_3PO_4$ and $H_2SO_4$, thereby obtaining a solid suspended in said aqueous medium, (c) separating said solid from said aqueous medium, and (d) calcining the separated solid at a temperature between 750° C. and 1,200° C. and grinding the calcined solid to grain sizes in the range of 0.5 μm to 5.0 μm.

9 Claims, 4 Drawing Sheets

GRAPH – XRD Spectra Examples 1-8 and References (B, A, A1)

CERIA BASED GLASS POLISHING COMPOSITION AND A PROCESS FOR THE MANUFACTURE THEREOF

The present invention refers to a ceria based polishing composition and to a process for the manufacture thereof. Such compositions are used for the polishing of glass or like materials.

Among the polishing compositions currently used in the glass industry, those based upon cerium typically perform the best. A variety of processes for the manufacture or preparation of such compositions are known. For example, it has been proposed to prepare cerium-based polishing compositions by precipitating ceric hydroxide, by means of ammonia, from a rare earth nitrate solution in which the cerium has been preliminarily oxidized [Chemical Abstracts, 80, 51688, (1974)].

An improved process for the preparation of polishing compositions is described in U.S. Pat. No. 4,942,697. Accordingly polishing compositions are prepared by means of precipitation of cerium and co-precipitation of cerium with other rare earth. Moreover, the process requires the addition of elements and compounds respectively such as F, $PO_4$, $B_2O_3$ or combinations of those in the precipitation step. After drying and calcining of the co-precipitated intermediates, cerium based oxides are formed which after grinding and classifying yield polishing compositions showing high stock removal rates. According to example 1 of U.S. Pat. No. 4,942,697 a composition of ceriumoxide (99%) containing 1% F is obtained. The preparation of another composition which is based on cerium and lanthanum in a ratio of approx. 70/30 is disclosed under example 10. That composition contains also F and $PO_4$.

Such a typical material is available on commercial scale since many years, which is known under the trade name CEROX 1650.

A disadvantage of the co-precipitation processes is the fact that pH must strictly be controlled during the process to get defined chemical rare earth compositions. For example the "pH-window" disclosed in the examples of U.S. Pat. No. 4,942,697 in the co-precipitation step is only +/−0.1.

In the paper "Development of Polishing Powders Production at JSC", CHMP, Russia (Authors: Kosynkin et al.) presented on the "$4^{th}$ International Conference on f-elements" (Madrid, Sep. 17-21, 2000) there are described crystal lattice parameters for F-containing cerium compounds with F contents in a range between 3-13 weight % corresponding to a crystal lattice in the range of 5.5367 to 5.4439 Angstroem (corresponds to 0.55367 to 0.54439 nm). The authors claim that the loss of polishing ability is a minimum, when the F content is 6-8 weight % in the compound.

U.S. Pat. No. 6,585,787 describes an abrasive which is based on $CeO_2$ and contains 0.5-10% by weight of fluorine consisting of crystals with a lattice constant ranging from 0.544 nm to 0.56 mm.

The preparation of such compounds is disclosed using cerium oxide as a starting material. Out of the cerium oxides there is prepared a slurry which is subjected to ball milling and afterwards treated with an ammoniumfluoride solution. After drying and calcining an additional grinding step is applied to produce the required grain size of the final product.

The disadvantage of such a process is an additional treatment step of a cerium based oxide which has to be prepared separately in advance to the F-treatment step. Furthermore the application of a huge excess of ammonium fluoride, a hazardous chemical, is inevitable to achieve the final concentration of F in the product. On such treatment it is likely that F will appear in the waste water filtrate which will need a further step of purification.

SUMMARY OF THE INVENTION

In spite of the fact that ceria based polishing powders are used worldwide, there is still the need to improve production routes and the polishing performance of the powders especially in terms of stock removal rate.

The present invention is aimed to solve the problem related to the manufacturing process of cerium based oxides with improved stock removal rates in particular to avoid a co-precipitation step combined with a simultaneous addition of additives such as F, $PO_4$ or combinations thereof which requires a complex equipment and a complicated monitoring of the process, e.g. exact monitoring of throughputs of the chemicals to keep the pH within the requested tight window.

Accordingly a major objective of the present invention is the provision of an improved process for the preparation of polishing compounds with a high stock removal rate. The ceria based polishing composition according to the invention can be produced by a process, comprising (a) suspending an inorganic cerium salt or cerium hydroxide with a cerium content calculated as cerium oxide in the range of 50%-100% based on total rare earth oxide (TREO) in an aqueous medium thereby obtaining an aqueous suspension, (b) treating said aqueous suspension with an acid or a salt of an acid selected from the group of HF, $H_3PO_4$ and $H_2SO_4$, thereby obtaining a solid suspended in said aqueous medium, (c) separating said solid from said aqueous medium, and (d) calcining the separated solid at a temperature between 750° C. and 1,200° C. and grinding the calcined solid to grain sizes in the range of 0.5 μm to 5.0 μm.

The cerium content preferably is less than 100% based on TREO (=Total Rare Earth Oxide) with the rest being at least one rare earth metal selected from the group of Y, La, Pr, Nd, Sm, Eu, Gd, Tb, Dy, Ho, Er, Tm, Yb and Lu.

An advantageous embodiment of the process according to the invention is characterized in that $Zr(OH)_4$ and/or at least one rare earth oxide selected from the group of rare earth metals of Y, La, Pr, Nd, Sm, Eu, Gd, Tb, Dy, Ho, Er, Tm, Yb and Lu is added to the suspension.

Instead of the at least one rare earth oxide a precursor of said rare earth oxide can be added to the suspension with the hydroxide, chloride or nitrate of a rare earth is preferred.

In a further advantageous embodiment of the invention the rare earth oxide is $La_2O_3$.

The present invention is also directed to a ceria based polishing composition obtainable by the process according to the invention. This composition is new because it differs significantly in the XRD spectra from the state of the art compounds indicating different phase compositions. The main differences in the peaks against reference materials can be found under the herein referred examples and in the graphs.

The ceria based polishing composition according to the invention preferably contains fluoride in the range of 0.5-14% by weight, phosphor calculated as $P_2O_5$ in the range of 0.5-5% by weight and sulfur calculated as $SO_3$ in the range of 0.3-5% by weight.

The polishing compounds prepared according to the process were characterised chemically (Loss on ignition, rare earth oxides, F, $P_2O_5$, $SO_3$), physically (Particle size, XRD) and in terms of polishing effectiveness.

Conditions for testing polishing effectiveness:
Measuring Apparatus: Polishing machine LOH, PM 150
Glass: Colorless optical crown glass
Glass diameter: 6.5 cm
Rotation of polisher: 1500 rpm
Pressure: 763 g/cm2
Polishing Pad: PU LP 66
Concentration of suspension: 50 g/liter
Temperature of suspension: 25-30° C.

BRIEF DESCRIPTION OF THE FIGURES

FIG. 1 shows the XRD spectra from the composition prepared according to Example 1.

FIG. 2 shows the XRD spectra from the composition prepared according to Example 5.

FIG. 3 shows the XRD spectra from the composition prepared according to Example 8.

FIG. 4 shows the XRD spectra from the composition prepared according to Example 4.

FIG. 5 shows the XRD spectra from commercially available Reference B (Ref B) material.

FIG. 6 shows the XRD spectra from the compositions prepared according to Example 2.

FIG. 7 shows the XRD spectra from the composition prepared according to Example 3.

FIG. 8 shows the XRD spectra from the composition prepared according to Example 6.

FIG. 9 shows the XRD spectra from the composition prepared according to Example 7.

FIG. 10 shows the XRD spectra from the composition prepared according to the Example Reference A (Ref A).

FIG. 11 shows the XRD spectra from commercially available Reference A1(Ref A1) material.

FIG. 12 shows the XRD spectra from the compositions prepared according to Example 1 together with the XRD spectra from commercially available Reference B (Ref B) material.

FIG. 13 shows the the XRD spectra from the compositions prepared according to Example 4 together with the XRD spectra from commercially available Reference B (Ref B) material.

FIG. 14 shows the the XRD spectra from the compositions prepared according to Example 5 together with the XRD spectra from commercially available Reference B (Ref B) material.

FIG. 15 shows the the XRD spectra from the compositions prepared according to Example 8 together with the XRD spectra from commercially available Reference B (Ref B) material.

DETAILED DESCRIPTION

Figure 1:
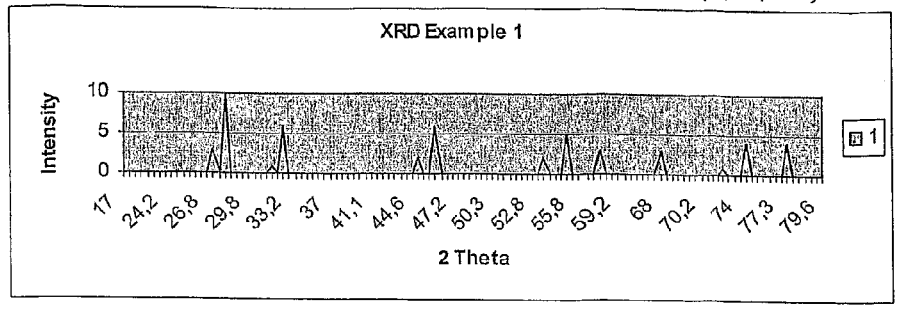
FIGS. 1 to 11 each show the XRD spectra from
a compositions prepared according to Examples 1-8,
Reference A (Ref A) material prepared as indicated in the Example part, or
commercially available Reference B (Ref B) and Reference A1 (Ref A1) material as respectively indicated in the heading of the Figures.
Figure 2:
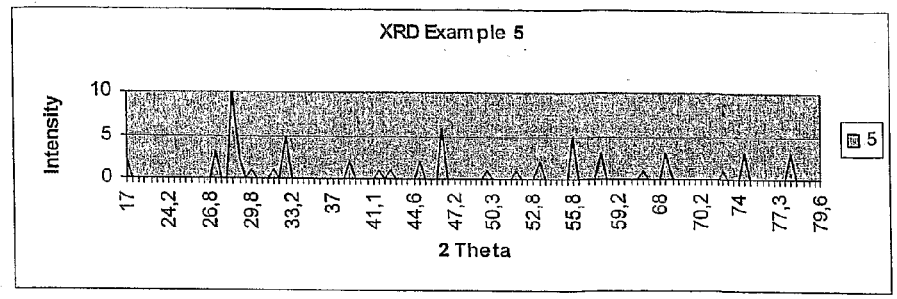
Figure 3:
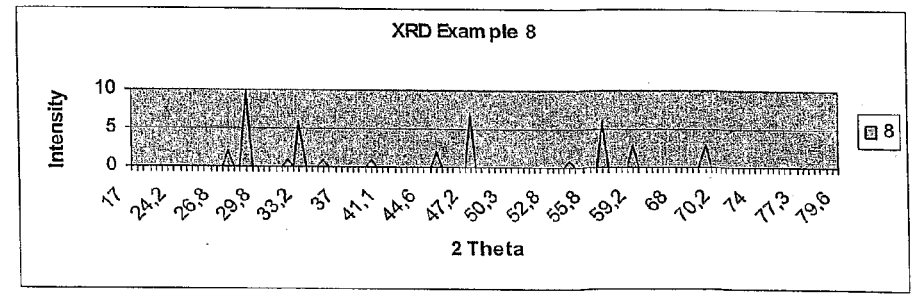
Figure 4:
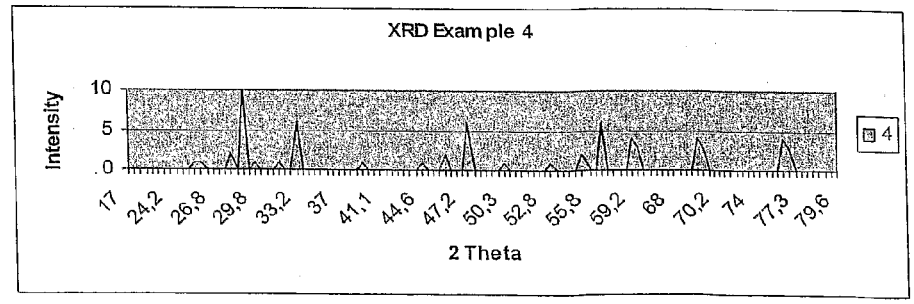
Figure 5:
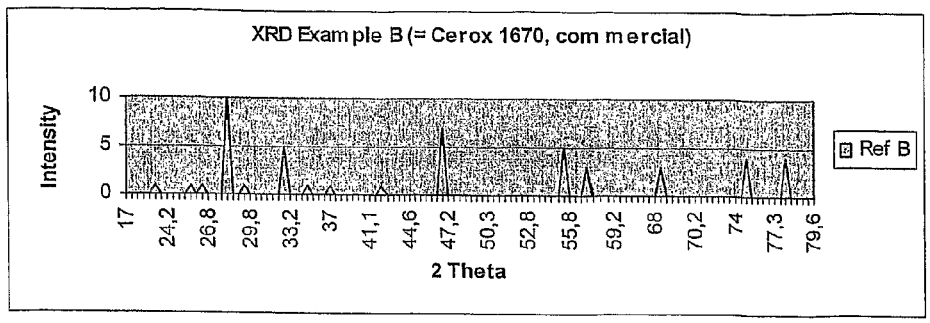
Figure 6:
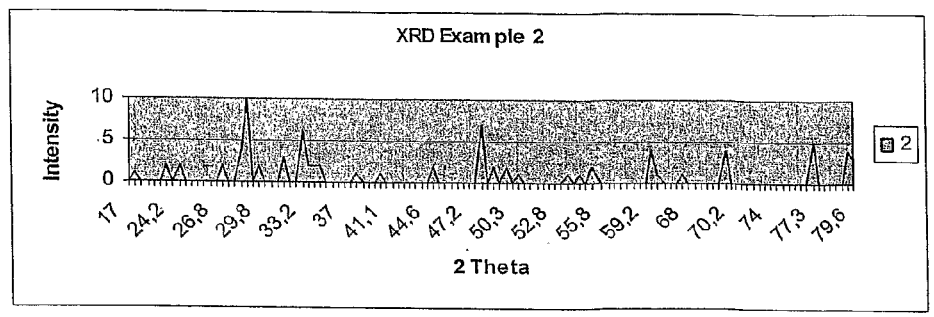
Figure 7:
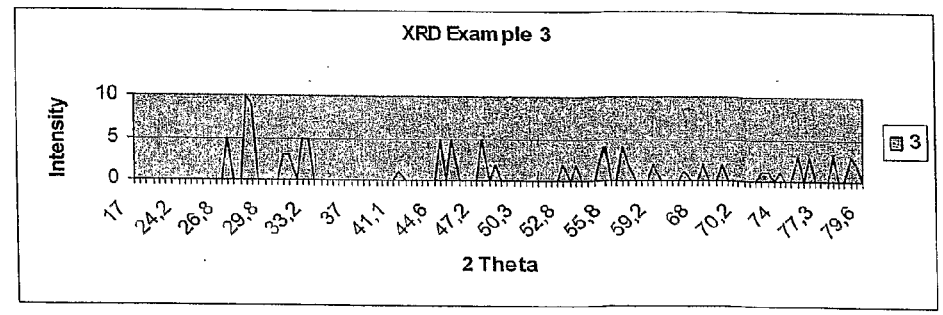
Figure 8:
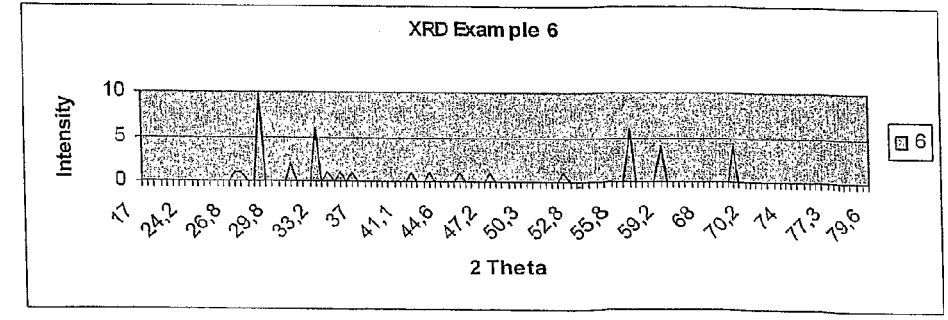
Figure 9:
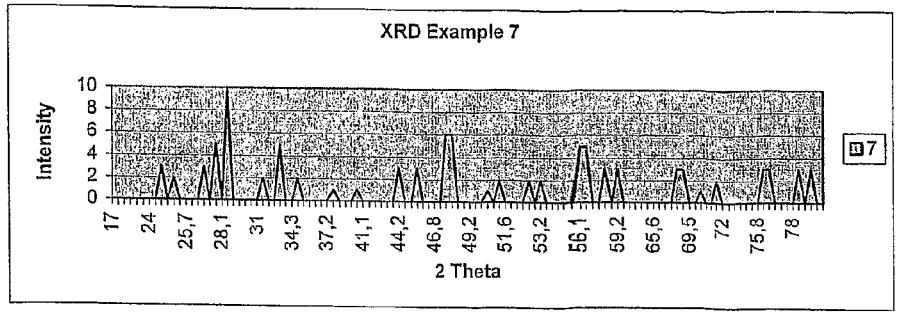
Figure 10:
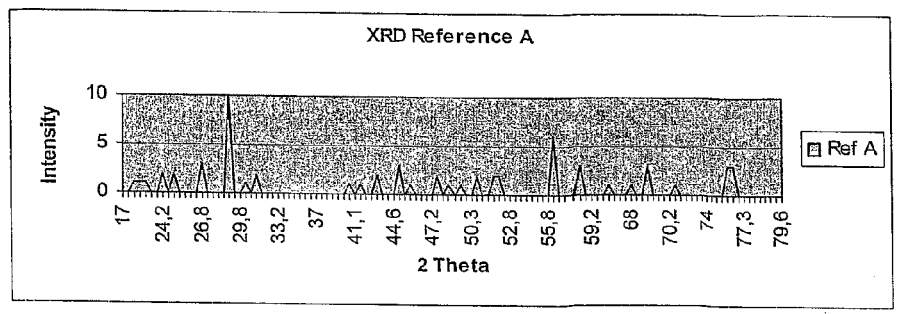
Figure 11:
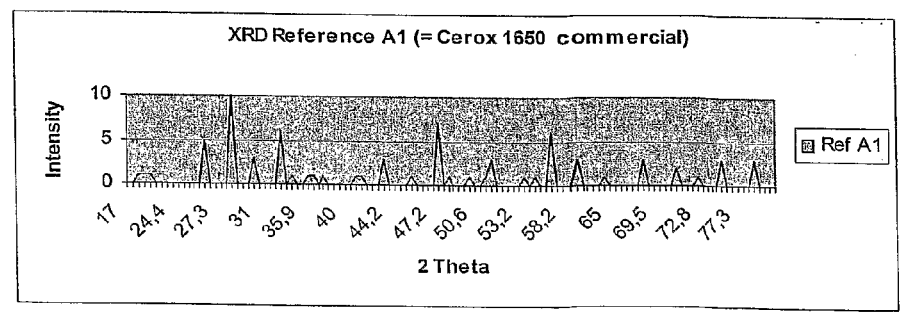
Figure 12:
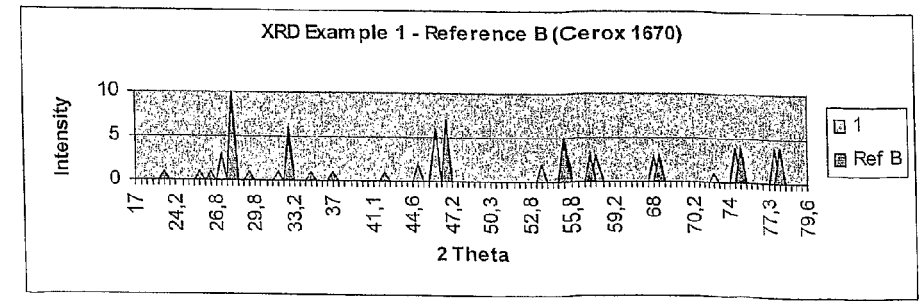
FIGS. 12 to 15 show the the XRD spectra from the compositions prepared according to the relevant preparation example as indicated in the respective Figures together with the XRD spectra of the Reference B material.
Figure 13:
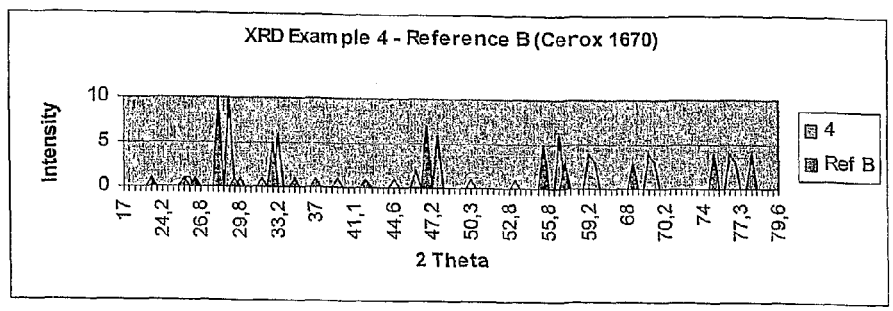
Figure 14:
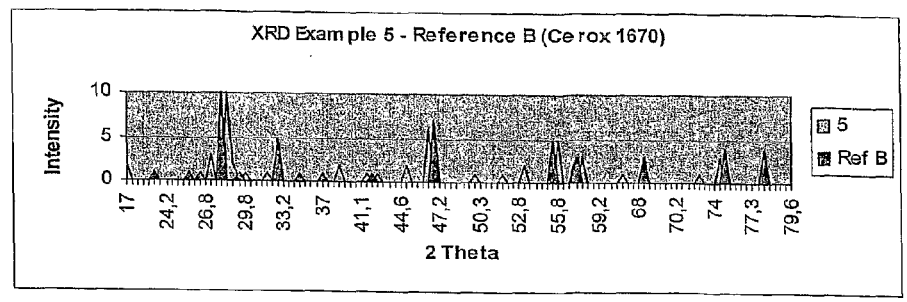
Figure 15:
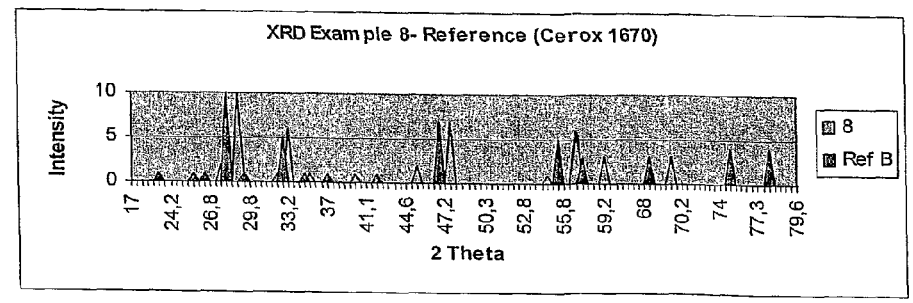

In the following preferred embodiments of the invention are described in more detail.
1. Preparation of the Raw Materials 1.1. Preparation of Cerium Hydroxide (High $CeO_2$ Content, >95% $CeO_2$/TREO)

The preparation of cerium hydroxide is a well known process. The synthesis for such a material is described for example in Chem. Abstracts 80, 51688 (1974). It can be prepared also according to the following procedure:

200 kg of cerium carbonate (commercially available bulk material, 51.1% TREO) are dissolved in a mixture out of 146 liter conc. $HNO_3$ and 1400 liter water. Into the resulting cerium nitrate solution there is feeded 234 liter of ammonia solution (prepared out of 250 liter 15% Ammonia and 250 liter of water) and 200 liter $H_2O_2$ solution (prepared out of 200 liter $H_2O_2$ 30% and 250 liter of water) at a pH-value between 4.2-7 over a period of 2 hours. After the precipitation is completed the mixture is heated up by steam to a temperature of 70-80° C. for a period of another 2 hrs and the mixture cooled down to approx. 50° C. After filtration and washing the solid residue with water there were yielded 195 kg of cerium hydroxide (wet cake) with the following characteristics:
LOI: 53%
TREO: 52%
$CeO_2$/TREO: >99.9%
CeIV/Total Ce (=CeIII+CeIV): 92.5%
Yield: >99%

1.2. Preparation of Cerium Hydroxide (Low $CeO_2$ Content)

To 769 liter of a mixed rare earth chloride solution containing 223.5 g TREO/liter, (solution prepared out of solid mixed rare earth chloride with approx. 45% TREO, $CeO_2$/TREO=50% and water) is added 7.6 liter $H_2O_2$ (30%). To the mixture there is added 30.8 liter $H_2O_2$ (30%) and 350 liter NaOH solution (conc.=200.8 g/liter) within a period of 1.5 hrs. After additional stirring of the reaction mixture for 1 hr the mixture is heated to a temperature between 70 and 75° C. for 30 min and there is added 130 liter of sodium carbonate solution (conc.=100 g/liter). The precipitate is isolated by filtration, washed with water, with 0.01 n sodium carbonate solution afterwards and with water again to yield 248 kg of cerium-hydroxide (wet cake) with the following characteristics:
TREO: 47%
$CeO_2$/TREO: 71.9%
$La_2O_3$/TREO: 4.4%
$Pr_6O_{11}$/TREO: 4.8%
$Nd_2O_3$/TREO: 14.8%
$Sm_2O_3$/TREO: 0.2%
Yield: 67.8%

2. Preparation of the Polishing Compounds According to the Invention

EXAMPLE 1

18 kg Cerium hydroxide (TREO content=52%, $CeO_2$/TREO=99.9%) are suspended in 15 liter of water followed by consecutive addition of 1 liter of 36% (w/w) HCl, 2 kg of $La_2O_3$ (TREO=99%, $La_2O_3$/TREO=99.9%), 1 liter of HF (40% w/w) and finally 2 kg of $La_2O_3$.

The suspension warms up to approx. 85° C. by adding the $La_2O_3$ and HF. After addition of the compounds the mixture is stirred over a period for 1 hr. The suspension is treated with ammoniumbicarbonate solution (100 g ABC/liter) until a pH of 8 to 8.5 is achieved to avoid any dissolution of La. The mixture is stirred for an additional hour and the solid is separated by filtration. Without any further washing process the solid is transferred into a muffle furnace and calcined at 1060° C. (furnace temp.) over a period of 8 hrs.

The calcined product is grounded in a jet mill producing a polishing composition having the following characteristics:

LOI: 0.43%
CeO$_2$: 68.4%
La$_2$O$_3$: 29.0%
F: 2.0%
XRD-spectra, significant differences to Reference B:
Peaks at (2 Theta degrees): 27.0, 44.8, 46.5, 58.5
More details see graph below
Particle Size (d50): 0.98 μm
Less than 0.01% would not pass through a 32 μm sieve
Polishing effectiveness: 2.96 mg/cm2/min

EXAMPLE 2

10.6 kg Ceriumhydrate (TREO content=55%, CeO$_2$/TREO=98%) are suspended in 30 liter of water followed by addition of 4.8 kg of Zr(OH)$_4$ (ZrO$_2$ content=32%) and 1.98 liter of HF (40% w/w). After addition of the compounds the mixture is stirred over a period for 3 hrs at a temperature between 40-50° C. and the solid is separated by filtration. The filtered solid is washed with 1 liter water and the resulting wet cake dried at 150° C. over a period of 24 hrs. The dried material is calcined in a muffle furnace at 950° C. (furnace temp.) over a period of 8 hrs.

The calcined product is grounded in a jet mill producing a polishing composition having the following characteristics:
LOI: 0.35%.
CeO$_2$: 72%
ZrO$_2$: 18.4%
F: 1.7%
XRD-spectra, significant differences to Reference A1:
Peaks at (2 Theta degrees): 24.0, 28.1, 29.8, 38.4, 47.8, 59.4, 69.8, 79.4
More details see graph below
Particle Size (d50): 1.76 μm
Less than 0.03% would not pass through a 32 μm sieve
Polishing effectiveness: 2.86 mg/cm2/min

EXAMPLE 3

7.8 kg Ceriumhydrate (TREO content=55%, CeO$_2$/TREO=98%) are suspended in 30 liter of water followed by consecutive addition of 0.6 liter of 40% (w/w) HF and 0.4 kg H$_3$PO$_4$ (80%) and 1.8 kg of La$_2$O$_3$ (TREO 99%, La$_2$O$_3$/TREO=99.9%)

After addition of the compounds the mixture is stirred over a period for 3 hrs at approx. 50° C. The solid is separated by filtration and the precipitate washed with 1 l water. The solid is dried at 150° C. over a period of 24 hrs and then calcined in a mufflöe furnace over a period of 8 hrs.

The calcined product is grounded in a jet mill producing a polishing composition having the following characteristics:
LOI: 0.49%
CeO$_2$: 65.2%
La$_2$O$_3$: 26.5%
F: 2.6%
P$_2$O$_5$: 2.6%
XRD-spectra, significant differences to References A and A1:
Peaks at (2 Theta degrees): 28.1, 32.8, 52.8, 55.4, 68.6, 78, 79.1
More details see graph below
Particle Size (d50): 2.04 μm
Less than 0.01% would not pass through a 32 μm sieve
Polishing effectiveness: 3.04 mg/cm2/min

EXAMPLE 4

16.8 kg Ceriumhydrate (TREO content=47.4%, CeO$_2$/TREO=94.1%, La$_2$O$_3$/TREO 3.8%, Nd$_2$O$_3$/TREO=1.5%) are suspended in 30 liter of water followed by consecutive addition of 0.75 liter of HF (40% w/w) and 0.75 kg H$_2$SO$_4$ (33.8% w/w). After addition of the compounds the mixture is stirred over a period for 3 hrs. The suspension is treated with solid ammoniumbicarbonate until a pH of 7 to 8 is achieved. The solid is separated by filtration and the precipitate washed with 1 liter water. The solid is dried at 150° C. over a period of 24 hrs and then calcined in a muffle furnace over a period of 8 hrs.

The calcined product is grounded in a jet mill producing a polishing composition having the following characteristics:
LOI: 0.50%
CeO$_2$: 90.0%
La$_2$O$_3$: 4.8%
Other RE$_2$O$_3$: 2.1%
F: 0.8%
SO$_3$: 1.2%
XRD-spectra, significant differences to Reference B:
Peaks at (2 Theta degrees): 28.7, 33.2, 47.4, 56.3, 59.2, 59.4, 69.3, 69.5, 76.8, 76.9
More details see graph below
Particle Size (d50): 2.04 μm
Less than 0.01% would not pass through a 32 μm sieve
Polishing effectiveness: 2.44 mg/cm2/min

EXAMPLE 5

12.6 kg Ceriumhydrate (TREO content=47.4%, CeO$_2$/TREO=94.1%, La$_2$O$_3$/TREO=3.8%, Nd$_2$O$_3$/TREO=1.5%) are suspended in 30 liter of water followed by consecutive addition of 2 kg La$_2$O$_3$ (TREO=99%, La$_2$O$_3$/TREO=99.9%), 1.3 kg HCl (20% (w/w)) 0.8 liter of HF (40% w/w). After addition of the compounds the mixture is stirred over a period for 3 hrs at 40-50° C. The suspension is treated with solid ammoniumbicarbonate until a pH of 7 to 8 is achieved. The solid is separated by filtration and the precipitate washed with 1 liter water. The solid is dried at 150° C. over a period of 24 hrs and then calcined in a muffle furnace at 950° C. over a period of 8 hrs The calcined product is grounded in a jet mill producing a polishing composition having the following characteristics:
LOI: 0.47%
CeO$_2$: 70.3%
La$_2$O$_3$: 25.6%
F: 1.9%
XRD-spectra, significant differences to Reference B:
Peaks at (2 Theta degrees): 27.0, 28.7, 39.3, 44.8, 55.8
More details see graph below
Particle Size (d50): 1.24 μm
Less than 0.01% would not pass through a 32 μm sieve
Polishing effectiveness: 2.69 mg/cm2/min

EXAMPLE 6

14 kg Cerium hydroxide (TREO content=52.7%, CeO$_2$/TREO=93.9%, La$_2$O$_3$/TREO 3.9%) are suspended in 30 liter of water followed by consecutive addition of 0.75 liter of HF 40% (w/w) and 0.4 kg H$_3$PO$_4$ (80%). After addition of the compounds the mixture is stirred over a period for 3 hrs at 40-50° C. The solid is separated by filtration and the precipitate washed with 1 liter water. The solid is dried at 150° C. over a period of 24 hrs and then calcined in a muffle furnace at 850° C. over a period of 8 hrs.

The calcined product is grounded in a jet mill producing a polishing composition having the following characteristics:
LOI: 0.34%
CeO$_2$: 86.9%

La$_2$O$_3$: 5.2%
F: 0.8%
P$_2$O$_5$: 2.7
XRD-spectra, significant differences to References A and A1:
Peaks at (2 Theta degrees): 27.3, 59.2, 59.5,
More details see graph below
Particle Size (d50): 1.57 μm
Less than 0.02% would not pass through a 32 μm sieve
Polishing effectiveness: 2.49 mg/cm2/min

EXAMPLE 7

15 kg Cerium hydroxide (TREO content=50%, CeO$_2$/TREO=73.0%, La$_2$O$_3$/TREO=6.5%, Nd$_2$O$_3$+Pr$_6$O$_{11}$+Sm$_2$O$_3$/TREO=20.5) are suspended in 30 liter of water followed by consecutive addition of 0.75 liter of 40% (w/w) HF and 0.5 liter H$_3$PO$_4$ (80%). After addition of the compounds the mixture is stirred over a period for 3 hrs at 40-50° C. The solid is separated by filtration and without any washing process dries at 150° C. over a period of 24 hrs and then calcined in a muffle furnace at 950° C. over a period of 8 hrs.

The calcined product is grounded in a jet mill producing a polishing composition having the following characteristics:
LOI: 0.32%
CeO$_2$: 69.7%
La$_2$O$_3$: 6.6%
Nd$_2$O$_3$+Pr$_6$O$_{11}$+Sm$_2$O$_3$: 18.5%
F: 1.7%
P$_2$O$_5$: 3.2%
XRD-spectra, significant differences to References A and A1:
Peaks at (2 Theta degrees): 24.4, 28.0, 35.2, 45.3, 51.2, 53.2, 59.2, 79.1
More details see graph below
Particle Size (d50): 1.21 μm
Less than 0.01% would not pass through a 32 μm sieve
Polishing effectiveness: 2.22 mg/cm2/min

EXAMPLE 8

11 kg Cerium hydroxide (TREO content=54%, CeO$_2$/TREO=98%) are suspended in 30 liter of water followed by consecutive addition of 1 liter of HF (40% (w/w)). After addition of the HF the mixture is stirred over a period for 3 hrs at 40-50° C. The solid is separated by filtration and washed with 1 liter of water. The solid is dried at 150° C. over a period of 24 hrs and then calcined in a muffle furnace at 950° C. over a period of 8 hrs.

The calcined product is grounded in a jet mill producing a polishing composition having the following characteristics:
LOI: 0.72%
CeO$_2$: 91.0%
La$_2$O$_3$: 1.7%
F: 2.9%
XRD-spectra, significant differences to Reference B:
Peaks at (2 Theta degrees): 27.3, 28.7, 33.2, 45.3, 47.4, 56.3, 59.2, 69.5.
More details see graph below
Particle Size (d50): 1.72 μm
Less than 0.01% would not pass through a 32 μm sieve
Polishing effectiveness: 1.70 mg/cm2/min 3. Preparation of Reference Material (A) by Co-precipitation Technique A reference material was prepared according to Example 3, U.S. Pat. No. 4,942,697 instead that of Nd Lanthanum was used. Thus in a 3 l beaker there were feeded 1 liter of water and warmed up to 50° C. 1 liter of a 1 m Ce-nitrate solution, 1 m Lanthanum nitrate solution, 1 m HF-solution, 0.08 m H$_3$PO$_4$ solution, 6 m H$_2$O$_2$ solution and 0.4 liter 5 m ammonia solution were fed into the beaker under pH control between 7.0 (+/-0.1) at temp. control of 50° C. The resulting suspension is heated up to 80° C. for 1 h; the precipitate is separated by filtration, dried at 300° C. and calcined at 850° C. for 1 hr in a muffel furnace.

The calcined product is grounded in a jet mill producing a polishing composition having the following characteristics:
LOI: 1.6%
TREO: 93.6%
CeO$_2$: 69.6%
La$_2$O$_3$: 29.1%
F: 4.75%
P$_2$O$_5$: 2.2%
XRD-spectra: see graph below
Particle Size (d50): 0.7 μm
Less than 0.05% would not pass through a 32 μm sieve.
Polishing effectiveness: 2.14 mg/cm2/min 4. Commercially Available Materials—Characteristics
Reference B—"Cerox 1670"
LOI: 0.31%
TREO: 97.4%
CeO$_2$: 74.0%
La$_2$O$_3$: 23.4%
F: 0.94%
XRD-spectra: see graph below
Particle Size (d50): 2.0 μm
Less than 0.05% would not pass through a 32 μm sieve.
Reference A1—"Cerox 1650"
LOI: 0.64%
TREO: 93.6%
CeO$_2$: 69.9%
La$_2$O$_3$: 26.8%
F: 2.5%
P$_2$O$_5$: 2.7%
Particle Size (d50): 1.5 μm
Less than 0.05% would not pass through a 32 μm sieve.

The invention claimed is:
1. Process for the manufacture of a ceria based polishing composition, comprising
   (a) suspending an inorganic cerium salt or cerium hydroxide with a cerium content calculated as cerium oxide in the range of 50%-100% based on Total rare earth oxide (TREO) in an aqueous medium thereby obtaining an aqueous suspension, which
   aqueous suspension is treated with an acid or a salt of an acid selected from the group of HF, H$_3$PO$_4$ and H$_2$SO$_4$, thereby obtaining a solid suspended in said aqueous medium,
   (b) separating said solid from said aqueous medium, and
   (c) calcining the separated solid at a temperature between 750° C. and 1,200° C. and grinding the calcined solid to grain sizes in the range of 0.5 μm to 5.0 μm.
2. Process according to claim 1, characterized in that said cerium content is less than 100% based on TREO with the rest being at least one rare earth metal selected from the group of Y, La, Pr, Nd, Sm, Eu, Gd, Tb, Dy, Ho, Er, Tm, Yb and Lu.
3. Process according to claim 1, characterized in that Zr(OH)$_4$ and/or at least one rare earth oxide selected from the group of rare earth metals of Y, La, Pr, Nd, Sm, Eu, Gd, Tb, Dy, Ho, Er, Tm, Yb and Lu is added to the suspension.
4. Process according to claim 3, characterized in that as said at least one rare earth oxide a rare earth oxide precursor is added to the suspension.

5. Process according to claim 4, characterized in that as rare earth oxide precursor the hydroxide, chloride or nitrate of a rare earth is used.

6. Process according to claim 3, characterized in that the rare earth oxide is $La_2O_3$.

7. Ceria based polishing composition obtained by a process according to one of the claim 1-6.

8. Ceria based polishing composition according to claim 7, characterized in that it contains fluoride in the range of 0.5-14% by weight, phosphor calculated as $P_2O_5$ in the range of 0.5-5% by weight and sulfur calculated as $SO_3$ in the range of 0.3-5%.

9. Process according to one of the claim 2, characterized in that $Zr(OH)_4$ and/or at least one rare earth oxide selected from the group of rare earth metals of Y, La, Pr, Nd, Sm, Eu, Gd, Tb, Dy, Ho, Er, Tm, Yb and Lu is added to the suspension.

* * * * *